United States Patent
Salgueiro et al.

(10) Patent No.: US 10,873,480 B2
(45) Date of Patent: *Dec. 22, 2020

(54) NETWORK SERVICE HEADER (NSH) METADATA-BASED END-TO-END MULTIMEDIA SESSION IDENTIFICATION AND MULTIMEDIA SERVICE OPTIMIZATION

(71) Applicant: Cisco Technology, Inc., San Jose, CA (US)

(72) Inventors: Gonzalo Salgueiro, Raleigh, NC (US); Prashanth Patil, Mountain View, CA (US); K. Tirumaleswar Reddy, Bangalore (IN); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,572

(22) Filed: Jul. 3, 2019

(65) Prior Publication Data
US 2019/0327111 A1 Oct. 24, 2019

Related U.S. Application Data

(63) Continuation of application No. 15/712,400, filed on Sep. 22, 2017, now Pat. No. 10,404,488, which is a
(Continued)

(51) Int. Cl.
*H04L 12/28* (2006.01)
*H04L 12/46* (2006.01)
(Continued)

(52) U.S. Cl.
CPC .......... *H04L 12/4633* (2013.01); *H04L 45/02* (2013.01); *H04L 45/74* (2013.01); *H04L 67/146* (2013.01); *H04L 67/16* (2013.01)

(58) Field of Classification Search
None
See application file for complete search history.

(56) References Cited

U.S. PATENT DOCUMENTS 6,801,508 B1   10/2004   Lim
8,135,845 B2   3/2012    Lee et al.
(Continued)

OTHER PUBLICATIONS

R. Ravindranath et al., "Session Initiation Protocol (SIP) Recording Metadata", Internet Draft, Aug. 12, 2015, 31 pages.
(Continued)

*Primary Examiner* — Elisabeth Benoit Magloire
(74) *Attorney, Agent, or Firm* — Edell, Shapiro & Finnan, LLC

(57) ABSTRACT

A network node in a service function chaining system receives multiple media streams of a media session between endpoints. Each media stream is encapsulated with a service header indicating a service function path and a session identifier. The network node determines that multiple service functions connected to the network node perform a particular service function in the service function path. The network node provides all of the media streams of the media session to a single service function instance to ensure that the media session is processed by the single service function.

20 Claims, 6 Drawing Sheets

Related U.S. Application Data continuation of application No. 14/989,132, filed on Jan. 6, 2016, now Pat. No. 9,819,512.

(51) Int. Cl.
  *H04L 12/751* (2013.01)
  *H04L 12/741* (2013.01)
  *H04L 29/08* (2006.01)

(56) References Cited

U.S. PATENT DOCUMENTS

| | | |
|---|---|---|
| 8,897,428 B2 | 11/2014 | Walker et al. |
| 9,379,931 B2 | 6/2016 | Bosch et al. |
| 9,479,443 B2 | 10/2016 | Bosch et al. |
| 10,050,870 B2 | 8/2018 | Reddy et al. |
| 2006/0059025 A1 | 3/2006 | Kato et al. |
| 2007/0014292 A1 | 1/2007 | Obata |
| 2007/0041376 A1 | 2/2007 | Lee et al. |
| 2007/0109966 A1 | 5/2007 | Lee et al. |
| 2013/0163446 A1 | 6/2013 | Kruger et al. |
| 2013/0170386 A1 | 7/2013 | Gonzalez De Langarica et al. |
| 2014/0362857 A1* | 12/2014 | Guichard ............ H04L 69/22 370/392 |
| 2015/0071285 A1 | 3/2015 | Kumar et al. |
| 2015/0319089 A1 | 11/2015 | Liu et al. |
| 2016/0248860 A1 | 8/2016 | Dunbar et al. |
| 2016/0344803 A1* | 11/2016 | Batz ................ H04L 12/1403 |
| 2017/0048815 A1* | 2/2017 | Clarke ................ H04W 64/00 |
| 2017/0104679 A1 | 4/2017 | Sunavala et al. |
| 2017/0134275 A1 | 5/2017 | Ni |
| 2017/0134538 A1 | 5/2017 | Mahkonen et al. |
| 2017/0155582 A1 | 6/2017 | Xu et al. |
| 2017/0163531 A1 | 6/2017 | Kumar et al. |
| 2017/0171070 A1 | 6/2017 | Kwon et al. |
| 2017/0195133 A1 | 7/2017 | Salgueiro et al. |
| 2018/0198717 A1 | 7/2018 | Khasnabish et al. |

OTHER PUBLICATIONS

P. Quinn et al., "Network Service Header", Network Working Group, Internet Draft, Mar. 24, 2015, 42 pages.

J. Halpern et al., "Service Function Chaining (SFC) Architecture", Network Working Group, Internet Draft, Jul. 24, 2015, 30 pages.

P. Jones, et al., "End-to-End Session Identification in IP-Based Multimedia Communication Networks", Network Norking Group, Internet Draft, Oct. 19, 2015, 33 pages.

Paul E. Jones, "Telecommunication Standardization Sector", Study Period 2013-2016, International Telecommunication Union, Study Group 16, TD 345R1 (PLEN/16), Geneva, Feb. 9-20, 2015, 9 pages.

* cited by examiner

NETWORK SERVICE HEADER (NSH) METADATA-BASED END-TO-END MULTIMEDIA SESSION IDENTIFICATION AND MULTIMEDIA SERVICE OPTIMIZATION

CROSS-REFERENCE TO RELATED APPLICATION

This application is a continuation of U.S. application Ser. No. 15/712,400, filed Sep. 22, 2017, which is a continuation of U.S. application Ser. No. 14/989,132, filed Jan. 6, 2016, now U.S. Pat. No. 9,819,512, the entirety of which are both incorporated herein by reference.

TECHNICAL FIELD

The present disclosure relates to applying service function chains in networks.

BACKGROUND

Service Function Chaining enables virtualized networking functions to be implemented as part of a cloud network. A Service Function Chain defines an ordered list of a plurality of service functions (e.g., firewall, compression, intrusion detection/prevention, load balancing, etc.) that may be applied to packet flows in the network. A flow enters the network through a classifier node that generates a Service Function Path for that flow according to the Service Function Chain policy. The classifier node encapsulates each packet of the flow with a Network Service Header that indicates the service functions to which the flow will be subjected, and the order the service functions will be applied.

Service Function Chaining and Network Service Headers provide a scalable, extensible, and standardized way of sharing metadata between both network nodes and service nodes within a network topology. This allows for disparate nodes that require shared context, but do not communicate directly, to share that context via metadata within the packets traversing the network or service topology.

DESCRIPTION OF EXAMPLE EMBODIMENTS

Overview

Figure 1:
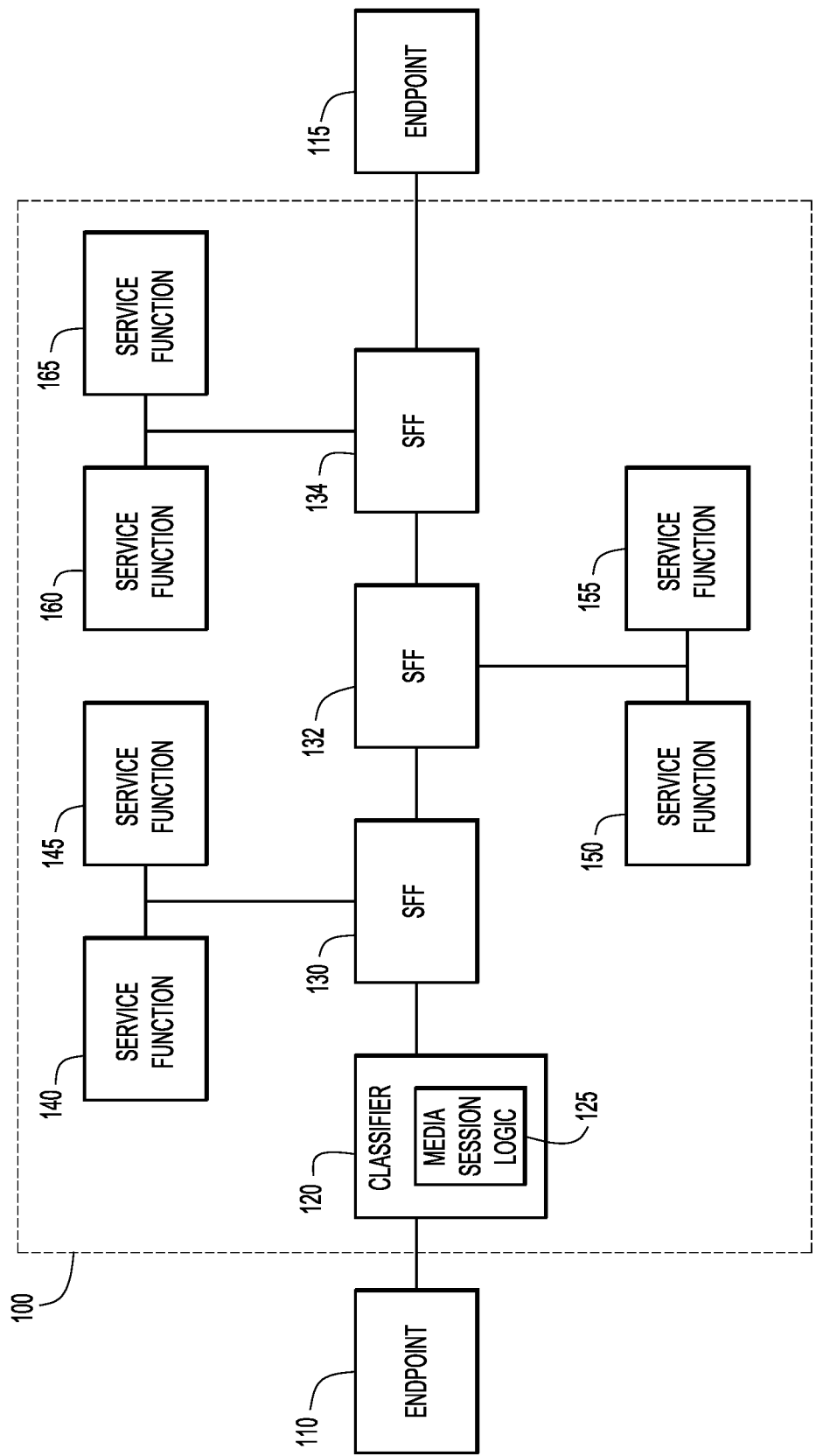
FIG. 1 is a system block diagram showing a Service Function Chain network environment for use with media sessions, according to an example embodiment.

A network device receives a media stream from a first endpoint device. The media stream is associated with a media session between the first endpoint device and at least a second endpoint device. The network device determines a path for the media stream. The path includes an ordered list of functions to process the media stream. The network device determines a session identifier for the media session and encapsulates the media stream with a header. The header comprises an indication of the path and the session identifier. The network device may be a physical device or a virtual device (software running on a compute node to perform functions of a physical network device).

Example Embodiments

When media streams traverse through a Service Function Chain domain, various service functions in a Service Function Path may use a mechanism to identify media streams associated with a particular media session useful. Identifying media streams may be useful for the purposes of session correlation (e.g., session recording), debugging/troubleshooting, session tracking, multimedia service optimization, among other purposes. All functions in such a deployment (e.g., a conferencing server, a recording server, a session border controller, a compressor, a logger, etc.) may be individual service functions in the Service Function Chain domain. Techniques presented herein provide for using the Network Service Header in the Service Function Chain domain to propagate a session identifier across the Service Function Chain domain in order to facilitate media session identification, correlation, and intelligent application services to the media streams.

One session identifier (ID) used in end-to-end multimedia session identification is the Session-ID, such as in the Session Initiation Protocol (SIP) and the H.323 protocol. The Session-ID may be used for a variety of supplementary services, such as call transfer, conferencing and SIP session recording. Carrying the end-to-end session identifier, such as the Session-ID, in the Network Service Header metadata to various multimedia service functions (e.g., Session Border Control/Back-to-back User Agents, SIP proxy, conferencing server, session recording server, transcoding server, etc.) enables identification, tracing, and correlation of signaling and media sessions.

In addition to troubleshooting and tracing, carrying the session identifier in the Network Service Header metadata enables making service function decisions and branching based on the session identifier. For example, selective session recording may be achieved by looking at the session identifier in the Network Service Header and dynamically directing the relevant streams to the session recoding service function.

The application of service functions to a given media stream based on a session identifier in the Network Service Header may be applied to multimedia protocols and supplementary services that have already implemented Session-ID, as well as those that have not yet implemented the Session-ID and may act as a way to accelerate end-to-end Session-ID development and deployment in a service chain scenario, without need for any type of deep packet inspection.

Referring now to FIG. 1, a simplified block diagram of a media-session-aware Service Function Chaining system 100 is shown. An endpoint 110 configured to communicate with an endpoint 115 in a media session using the Service Function Chaining system 100. Endpoints 110 and/or 115 may include, for example, smart phones, tablets, laptop computers, desktop computers, virtual machine applications running in a datacenter, or other types of computing devices with multimedia capabilities. The media session from endpoint 110 enters the system 100 at a classifier node 120 that includes media session logic 125. The system 100 also includes Service Function Forwarders (SFF) 130, 132, and 134 as (physical or virtual) network elements to direct the media session streams to various service functions. SFF 130 is coupled to service functions 140 and 145, which may be multiple instances of the same service function, i.e., two SIP Proxy servers. Alternatively, service functions 140 and 145 may include two different service functions, i.e., a SIP Proxy server and a Session Border Controller.

Similarly, SFF 132 is coupled to service functions 150 and 155, and may direct media streams to those service functions based on the service function path and the session identifier carried in the Network Service Header. SFF 134 is coupled to service functions 160 and 165, which represent the final service functions in the service function path. After the last service function has been performed, the SFF 134 forwards the media streams to endpoint 115. In the example shown in FIG. 1, three SFF nodes are shown, each coupled to two service functions, but the techniques presented herein may be applied to Service Function Chaining systems with any number of SFF nodes and any number of service functions. Additional network elements, either inside the Service Function Chain system 100 or outside of the system 100 may also be included to transmit the flows between endpoint 110 and endpoint 115.

In one example, a conferencing server or Session Border Controller identifies 5-tuples (e.g., source address, source port, destination address, destination port, protocol) for any media streams associated with an offer/answer exchange. It then conveys the 5-tuple for each media stream and the associated session identifier for the media session to the classifier node 120. The classifier node 120 generates a Network Service Header (NSH) with metadata headers. For each media stream associated with a particular session, the classifier node 120 sets a metadata header to include the session identifier. In this way, subsequent service functions in the service function path may correlate all of the media streams associated with a particular media session. The classifier node 120 may gather the session identifier from the packets in the media stream itself, or as a result of the classification into a service function path.

In another example, media streams from multiple participants, e.g., participants in a conference call, may be assigned the same session identifier. One or more classifier nodes, e.g., classifier node 120, may encode the same session identifier into the NSH for each media stream to ensure that they are grouped together at a Media Distribution Device (MDD) responsible for the conference call.

Figure 2A:
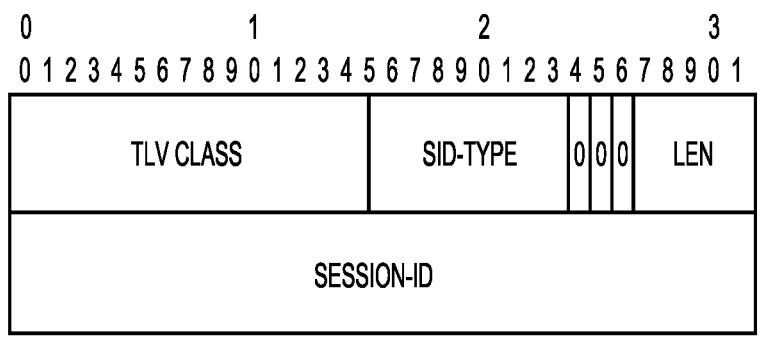
FIG. 2A illustrates a metadata header with a session identifier as used in a Service Function Chain network environment, according to an example embodiment.

In a further example, the NSH may be a variable length, Type 2 NSH, with a specific vendor type (e.g., Cisco), and an Intermediary-safe SIP session ID (INSIPID) with a reserved type (e.g., type 71). The metadata header that includes the session identifier may have a form described in FIG. 2A.

Figure 2B:
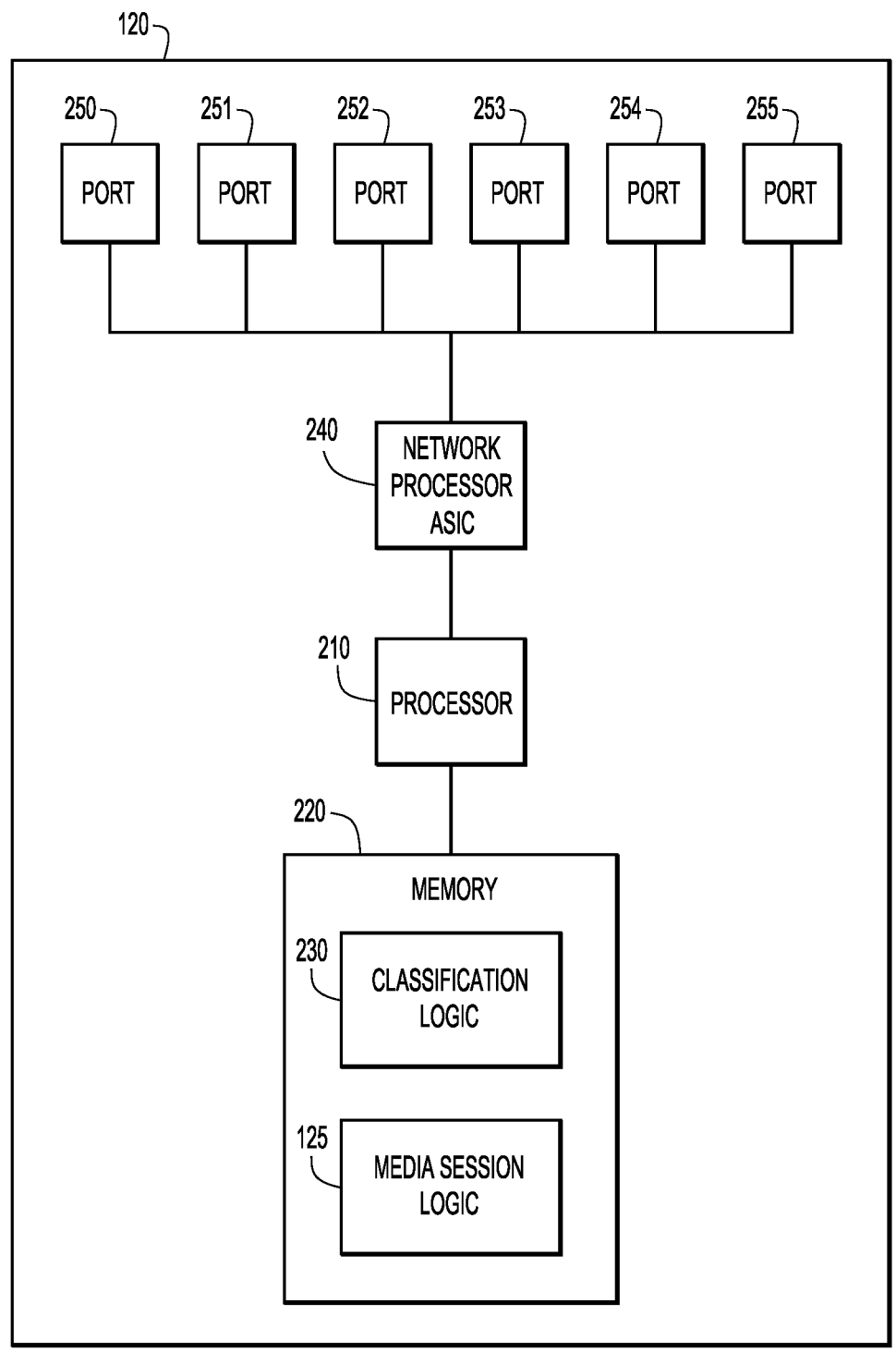
FIG. 2B is a simplified block diagram of a classifier network element within the Service Function Chain network environment, according to an example embodiment.

Referring now to FIG. 2B, a simplified block diagram is shown of a classifier network device 120 configured to perform the techniques of a classifier node. Classifier 120 includes, among other possible components, a processor 210 to process instructions relevant to processing communication packets for a Service Function Chain system, and memory 220 to store a variety of data and software instructions (e.g., Classification logic 230, Media Session logic 125, communication packets, etc.). The classifier 120 also includes a network processor application specific integrated circuit (ASIC) 240 to process communication packets that flow through the classifier device 120. Network processor ASIC 240 processes communication packets be sent to and received from ports 250, 251, 252, 253, 254, and 255. While only six ports are shown in this example, any number of ports may be included in classifier device 120.

Memory 220 may include read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (e.g., by the processor 210) it is operable to perform the operations described herein.

It is to be understood that the classifier network device may be a physical device or a virtual (software) device. In the latter case, the classifier network device is embodied as software running on a compute node (e.g., in a datacenter or other environment) through which traffic for determining how to be routed into a Service Function Chain.

Figure 3:
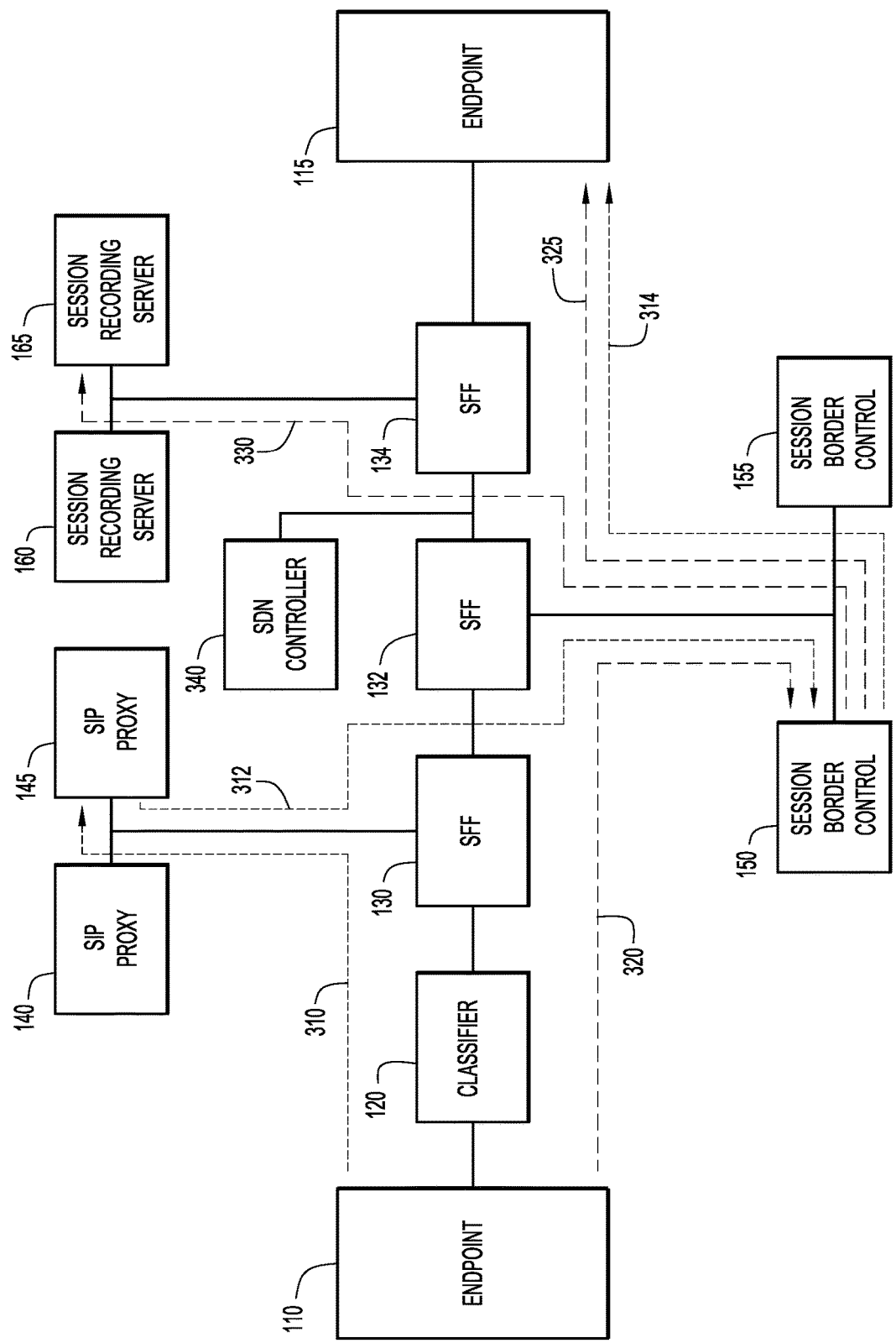
FIG. 3 is a system block diagram showing a classifier node initiating a media session between two endpoints, according to an example embodiment.

Referring now to FIG. 3, a simplified block diagram shows flows being routed from endpoint 110 to endpoint 115 through service functions based on a media session identifier. The classifier node 120 receives a packet from signaling flow 310 of a media session and determines a session identifier to associate with the media session. The classifier node 120 encapsulates the flow 310 with a Network Service Header and includes the session identifier in a metadata header of the Network Service Header. The signaling flow 310 is directed to a service function path that includes two service functions, such as a SIP proxy service function followed by a Session Border Control service function.

The SFF node 130 sends the signaling flow 310 to SIP Proxy 145 which generates signaling flow 312. The SFF node 130 forwards the signaling flow 312 to the next SFF node 132 in the service function path. The SFF node 132 sends the signaling flow 312 to the Session Border Controller 150, which generates a signaling flow 314. Since the Session Border Controller 150 is the final service function, the SFF node 132 removes the Network Service Header and forwards the signaling flow 314 to the endpoint 115.

The classifier node 120 also receives a media flow 320 from the endpoint 110 and determines that it is part of the same media session as the signaling flow 310. The classifier node 120 encapsulates the media flow 320 with a Network Service Header and includes the same session identifier in a metadata header of the Network Service Header. The media flow 320 is directed to a service function path that includes a service function, such as a Session Border Control service function.

The SFF node 132 sends the media flow 320 to the Session Border Controller 150. In one example, the SFF node 132 reads the session identifier in the Network Service Header, and sends any flows with the same session identifier to the same instance of the service function, e.g., Session Border Controller 150. This ensures that the same instance of each service function captures all of the flows associated with a particular media session. The Session Border Controller 150 generates media flow 325 and returns it to the SFF node 132. The SFF node 132 forwards the media flow 325 to the endpoint 115. In one example, the media flow may be part of a media session that is being recorded, and the Session Border Controller also generates a media flow 330, which is directed to a session recording service function. The media flow 330 is forwarded by SFF node 134 to the session recording server 165, where the session is recorded.

In FIG. 3, only one direction of data streaming is shown, i.e., from endpoint 110 to endpoint 115. However, media sessions may be bidirectional and include flows in both directions, such as from endpoint 115 to endpoint 110. Each stream will pass through a classifier node that will encapsulate the packets in the stream with a Network Service Header including a session identifier associated with the media session. In general, any streams to and/or from any number of endpoints may use the techniques presented herein to pass the session identifier to any service function in the service function path.

In one example, the session identifier may be used to help identify media sessions across separate call legs, such as flow 320 between the endpoint 110 and the Session Border Controller 150, and flow 325 between the Session Border Controller 150 and the endpoint 115. The session identifier carried in the Network Service Header may also be used to correlate flows across SIP Proxy 145, Session Border Controller 150, and session recording server 165.

In another example, the session identifier may be used to make decisions regarding service functions, such as selecting which service function to apply to particular media sessions. An entity, such as a Software Defined Network controller 340 may dynamically program classifier node 120 to alter and/or extend a service function path for specific sessions based on the session identifier. For instance, the classifier node 120 may be dynamically programmed to record only desired media sessions based on the session identifiers and selectively invoke the session recording service function. Similarly, the recording of the specific media sessions may be dynamically stopped at the request of the controller. This may be especially useful when users start/stop recording a media session midway through the session.

In a further example, the session identifiers may be used by the service functions to send statistics to a flow collector for various purposes, e.g., auditing, performance monitoring. The session identifiers would provide a common element to aggregate and summarize flows for media sessions across all of the separate legs of the flows.

Figure 4:
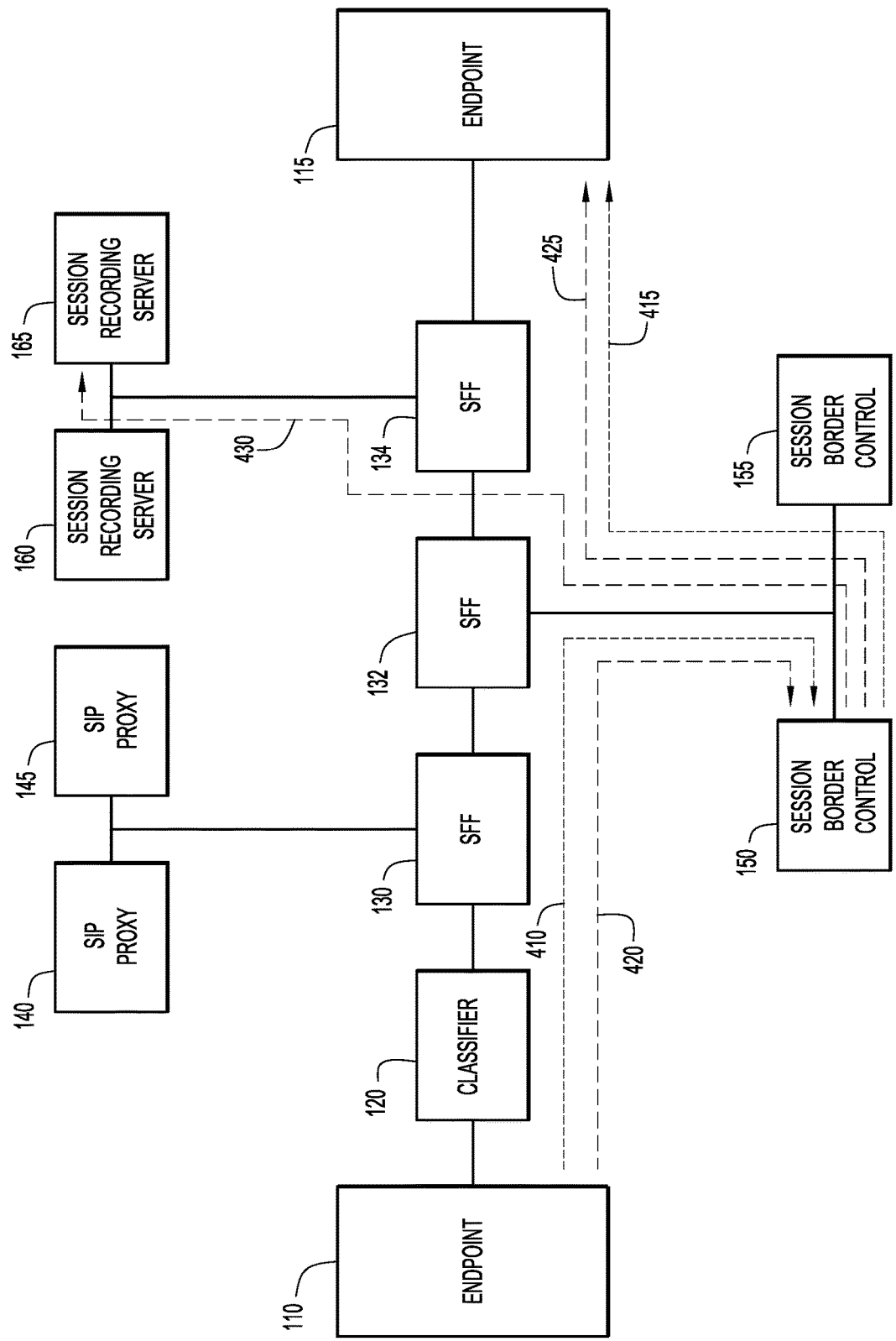
FIG. 4 is a system block diagram showing a classifier node using session identifier metadata to direct different media streams, according to an example embodiment.

Referring now to FIG. 4, a simplified block diagram shows media flows being selectively routed to different service functions based on session identifiers. In some cases, end-to-end session identifiers may be grouped or split to provide finer or coarser media stream granularity, as part of the classification done in the classifier node 120. The classifier 120 receives a video stream 410 and an audio stream 420 from endpoint 110. The video stream 410 and audio stream 420 belong to the same media session, and are initially encapsulated with the same session identifier in the Network Service Header. The service function paths associated with each stream include a Session Border Controller 150, which generates video stream 415 and audio stream 425 to send to the endpoint 115.

In one example, a user wants to record the audio of the media session, but not the video. The classifier node 120 may split the session identifier and create a new session identifier for the audio stream 420, encapsulating the audio stream 420 with a new Network Service Header. The new session identifier causes the Session Border Controller 150 to generate an audio stream 430 which is sent to the session recording server 165. The session recording server 165 records the audio stream 430 with the new session identifier, while the audio stream 425 and video stream 415 are sent to the endpoint 115 with the original session identifier. In other terms, the original session identifier may be referred to as a "first session identifier" and the new session identifier may be referred to as a "second session identifier". Likewise, the original Network Service Header may be referred to as a "first network service header" and the new Network Service Header may be referred to as a "second network service header".

Figure 5:
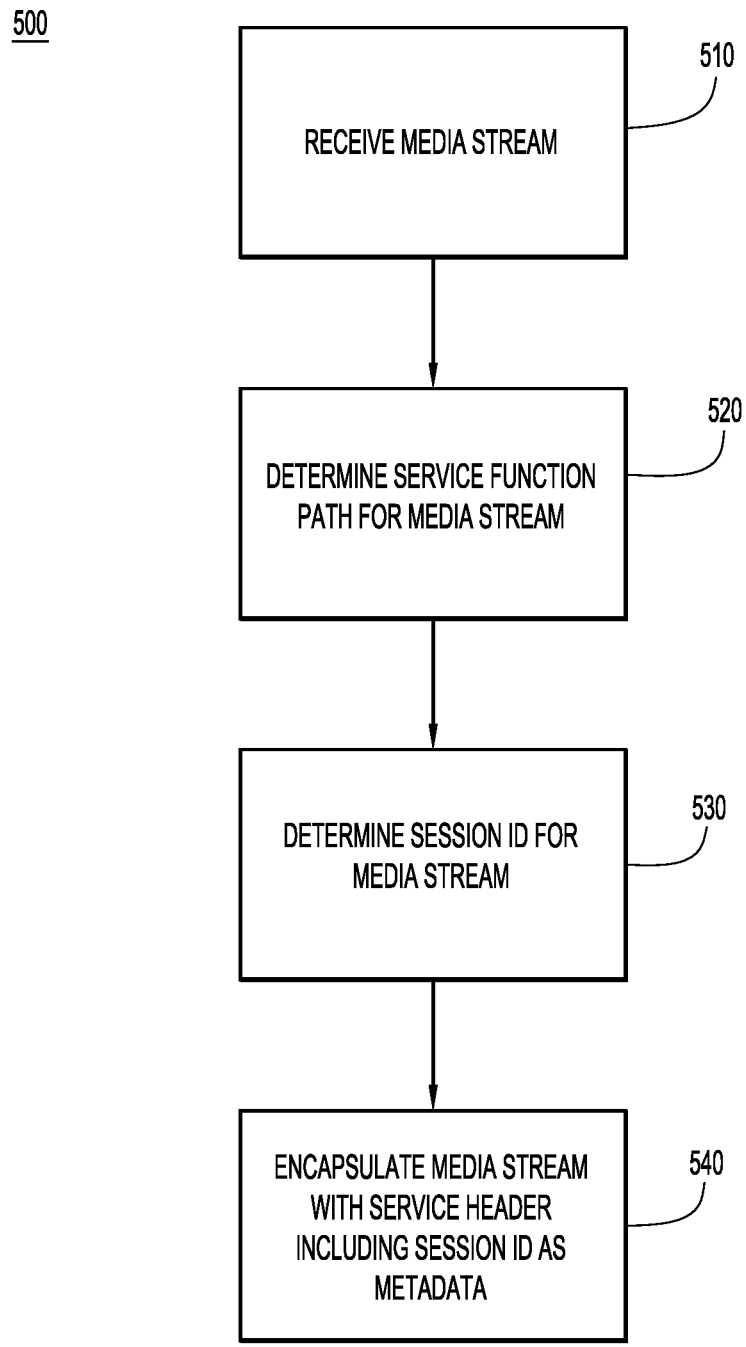
FIG. 5 is a flowchart showing the operations of a classifier node encapsulating a flow with a Network Service Header including session identifier information, according to an example embodiment.

Referring now to FIG. 5, a flowchart is shown for a process 500 by which a classifier node (classifier) inserts a media session identifier into the Network Service Header according to one example. In step 510, the classifier receives a media stream from a first endpoint. The media stream is part of a media session between the first endpoint and at least one other endpoint. In step 520, the classifier determines a service function path for the media stream. The service function path comprises an ordered list of service functions that will act on the media stream. In step 530, the classifier determines a session identifier (e.g., Session-ID) for the media session. The session identifier may be determined by information in packets of the media stream. Alternatively, the classifier may generate the session identifier based on the classification of the packets in the media stream.

In step 540, the classifier encapsulates the media stream with a Network Service Header that specifies the service function path that the media stream will take. The Network Service Header includes one or more metadata headers, one of which will include the session identifier. The metadata headers may be variable or fixed length, and may be formatted according to MetaData (MD) Type 1 or MD Type 2 headers. After the media stream is encapsulated with a Network Service Header, each of the service functions in the service function path act on the media stream. Each of the service functions may use the session identifier in the Network Service Header to correlate other media streams in the same media session.

In summary, the techniques presented herein leverage the Network Service Header to propagate end-to-end session identifiers for use in multimedia communication systems. This allows for media-session-based application of service, and multimedia sub- or super-media flow reclassification and branching. These techniques identify and correlate sessions in multimedia systems using metadata available in-band with the Network Service Header. This mechanism allows a communication system design that does not rely on a complex mechanism to convey session identifiers to all of the relevant service functions that may be able to use the session identifier. Further, the Network Service Header session identifier may be applied to media streams for protocols that have not defined an end-to-end session identifier. This allows for media-session-based logging and tracing, as well as application of intelligent services at midpoints in the service function path. Additionally, the techniques presented herein enable flexible granularity in processing media flows by grouping and splitting media flows according to session identifiers.

In one form, the techniques presented herein provide for a computer-implemented method performed at a classifier node for a service function chain, the method including receiving a media stream from a first endpoint device. The media stream is associated with a media session between the first endpoint device and at least a second endpoint device.

The classifier node determines a service function path for the media stream. The service function path comprises an ordered list of service functions to process the media stream. The classifier node determines a session identifier for the media session and encapsulates the media stream with a Network Service Header. The Network Service Header comprises an indication of the service function path and a metadata header with the session identifier.

In another form, the techniques presented herein provide for an apparatus comprising a network interface unit and a processor. The network interface unit is configured to communicate with a plurality of (physical or virtual) network devices having one or more service functions that are part of a service function chain, and a first endpoint device. The processor is configured to receive, via the network interface unit, a media stream from the first endpoint. The media stream is associated with a media session between the first endpoint and at least a second endpoint. The processor is configured to determine a service function path for the media stream. The service function path comprises an ordered list of service functions to process the media stream. The processor is configured to determine a session identifier for the media session and encapsulate the media stream with a Network Service Header. The Network Service Header comprises an indication of the service function path and a metadata header with the session identifier.

In yet another form, the techniques presented herein provide for a non-transitory computer readable storage media encoded with software comprising computer executable instructions. When the software is executed, the instructions are operable to cause a processor to receive a media stream from a first endpoint. The media stream is associated with a media session between the first endpoint and at least a second endpoint. The instructions cause the processor to determine a service function path for the media stream. The service function path comprises an ordered list of service functions to process the media stream. The instructions cause the processor to determine a session identifier for the media stream and encapsulate the media stream with a Network Service Header. The Network Service Header comprises an indication of the service function path and a metadata header with the session identifier.

The above description is intended by way of example only. Various modifications and structural changes may be made therein without departing from the scope of the concepts described herein and within the scope and range of equivalents of the claims.

What is claimed is:

1. A method comprising:
   obtaining at a network node, a plurality of media streams associated with a media session between a plurality of endpoints, wherein each respective media stream is encapsulated with a corresponding service header indicating a corresponding service function path of service functions to process the respective media stream and a session identifier associated with the media session;
   determining that a plurality of service function instances connected to the network node perform a particular service function in the corresponding service function path; and
   providing the plurality of media streams to a single service function instance of the plurality of service function instances to enable all of the media streams associated with the media session to be processed by the single service function instance.

2. The method of claim 1, further comprising obtaining the plurality of media streams from the single service function instance after the plurality of media streams have been processed.

3. The method of claim 2, further comprising providing the plurality of media streams to a subsequent network node, the subsequent network node connected to at least one service function instance of a subsequent service function in the service function path.

4. The method of claim 2, further comprising:
   determining that the particular service function is the last service function in the service function path;
   removing the corresponding service header from each respective media stream; and
   providing each respective media stream to a destination network node connected to a destination endpoint.

5. The method of claim 1, further comprising:
   obtaining a different media stream associated with a different media session, the different media stream encapsulated with a different service header indicating a different service function path of service functions to process the different media stream and a different session identifier associated with the different media session; and
   providing the different media stream to one of the plurality of service function instances.

6. The method of claim 1, further comprising:
   obtaining statistical information associated with the plurality of media streams from the single service function instance; and
   providing the statistical information to a flow collector along with the session identifier.

7. The method of claim 1, wherein the corresponding service function path includes a session recording service function to record the media session.

8. An apparatus comprising:
   a network interface configured to communicate with a plurality of network devices and a plurality of service function instances;
   a processor configured to:
      obtain via the network interface, a plurality of media streams associated with a media session between a plurality of endpoints, wherein each respective media stream is encapsulated with a corresponding service header indicating a corresponding service function path of service functions to process the respective media stream and a session identifier associated with the media session;
      determine that the plurality of service function instances perform a particular service function in the corresponding service function path; and
      provide the plurality of media streams to a single service function instance of the plurality of service function instances to enable all of the media streams associated with the media session to be processed by the single service function instance.

9. The apparatus of claim 8, wherein the processor is further configured to obtain the plurality of media streams from the single service function instance after the plurality of media streams have been processed.

10. The apparatus of claim 9, wherein the processor is further configured to provide the plurality of media streams to a subsequent network node, the subsequent network node connected to at least one service function instance of a subsequent service function in the service function path.

11. The apparatus of claim 9, wherein the processor is further configured to:

determine that the particular service function is the last service function in the service function path;

remove the corresponding service header from each respective media stream; and cause the network interface to provide each respective media stream to a destination network node connected to a destination endpoint.

12. The apparatus of claim 8, wherein the processor is further configured to:

obtain via the network interface, a different media stream associated with a different media session, the different media stream encapsulated with a different service header indicating a different service function path of service functions to process the different media stream and a different session identifier associated with the different media session; and cause the network interface to provide the different media stream to one of the plurality of service function instances.

13. The apparatus of claim 8, wherein the processor is further configured to:

obtain statistical information associated with the plurality of media streams from the single service function instance; and cause the network interface to provide the statistical information to a flow collector along with the session identifier.

14. One or more non-transitory computer readable storage media encoded with software comprising computer executable instructions and when the software is executed operable to cause a processor of a network node to:

obtain a plurality of media streams associated with a media session between a plurality of endpoints, wherein each respective media stream is encapsulated with a corresponding service header indicating a corresponding service function path of service functions to process the respective media stream and a session identifier associated with the media session;

determine that a plurality of service function instances connected to the network node perform a particular service function in the corresponding service function path; and provide the plurality of media streams to a single service function instance of the plurality of service function instances to enable all of the media streams associated with the media session to be processed by the single service function instance.

15. The non-transitory computer readable storage media of claim 14, wherein the instructions further cause the processor to obtain the plurality of media streams from the single service function instance after the plurality of media streams have been processed.

16. The non-transitory computer readable storage media of claim 15, wherein the instructions further cause the processor to provide the plurality of media streams to a subsequent network node, the subsequent network node connected to at least one service function instance of a subsequent service function in the service function path.

17. The non-transitory computer readable storage media of claim 15, wherein the instructions further cause the processor to:

determine that the particular service function is the last service function in the service function path;

remove the corresponding service header from each respective media stream; and provide each respective media stream to a destination network node connected to a destination endpoint.

18. The non-transitory computer readable storage media of claim 14, wherein the instructions further cause the processor to:

obtain a different media stream associated with a different media session, the different media stream encapsulated with a different service header indicating a different service function path of service functions to process the different media stream and a different session identifier associated with the different media session; and provide the different media stream to one of the plurality of service function instances.

19. The non-transitory computer readable storage media of claim 14, wherein the instructions further cause the processor to:

obtain statistical information associated with the plurality of media streams from the single service function instance; and provide the statistical information to a flow collector along with the session identifier.

20. The non-transitory computer readable storage media of claim 14, wherein the corresponding service function path includes a session recording service function to record the media session.

* * * * *